Patented Aug. 31, 1943

2,328,000

UNITED STATES PATENT OFFICE 2,328,000

RACEMIC-α-HYDROXY-β,β-DIMETHYL-GAMMA-BUTYRO LACTONE, ESTERS AND SALTS THEREOF

Jacob Finkelstein, New York, N. Y., assignor to Merck & Co., Inc., Rahway, N. J., a corporation of New Jersey No Drawing. Application July 3, 1940, Serial No. 343,779

4 Claims. (Cl. 260—344)

This invention relates to racemic α-hydroxy-β,β-dimethyl-gamma-butyrolactone, derivatives thereof.

I have discovered that racemic α-hydroxy-β,β-dimethyl-gamma-butyrolactone may be obtained by reacting isobutyraldehyde and formalin in the presence of an alkali metal carbonate at below 20° C., to form 2,2-dimethyl propanol-3-al-1, treating the latter compound with HCN to form the corresponding nitrile, and treating the said nitrile with concentrated hydrochloric acid to form the said lactone.

This lactone may be reacted with β-alanine to form pantothenic acid, a valuable growth promoting substance.

I have also discovered that salts of such lactone may be prepared, which are useful in the resolution of the racemic lactone into its optically active isomers.

Example I

Two hundred gms. of isobutyraldehyde and 224 gms. of 40% formalin are mixed, and, while stirring with cooling in an ice bath, 160 gms. of potassium carbonate are added in small portions. During the reaction, it is essential that the temperature be maintained below 20° C. After all of the potassium carbonate is added, the mixture is stirred for an additional 45 minutes, during which time the mixture becomes viscous. The product is extracted with ether, and the extract dried over anhydrous sodium sulfate.

The ether is distilled off, and the viscous residue distilled at 15 mm., B. P. 83–86° C. Yield 132 gms. On recrystallization from water, 2,2-dimethyl propanol-3-al-1 is obtained as a white crystalline solid, which when recrystallized from alcohol and drying over $P_2O_5$, melts at 96–7° C.

Seventy-two gms. of 2,2 dimethyl propanol-3-al-1 are warmed and stirred with a solution of 80 gms. of sodium bisulfite in 500 cc. water. When the aldol is all dissolved, the mixture is cooled to and maintained at 0–10° C., and, while stirring, a solution of 46 gms. of potassium cyanide in 100 cc. of water is added slowly. The mixture is stirred for 1 hour at 0–10° C. after all of the cyanide is added. The ice bath is then removed, and the mixture stirred until it reaches room temperature. The mixture is separated, and the aqueous layer extracted with ether. The oily product and ether extracts are combined, dried over anhydrous sodium sulfate, filtered, and the ether evaporated. The nitrile is a viscous liquid, yield 73 gms.

A solution of 38 gms. of the above nitrile in 75 cc. of ether is added dropwise, while stirring and keeping the temperature at 10–15° C., to 100 cc. of concentrated hydrochloric acid. The mixture is then allowed to stand overnight, during which time ammonium chloride crystallizes out. 100 cc. of water are added, and the mixture heated on the steam bath for 3 hours, during which time the ether is distilled off. The mixture is adjusted to pH 7.2 with sodium hydroxide and sodium bicarbonate, and extracted continuously with ether for 16 hours. The extracts are combined, dried over sodium sulfate, and distilled. B. P. 120–121° at 10 mm. The racemic α-hydroxy-β,β-dimethyl-gamma-butyrolactone is a colorless liquid, which immediately solidifies, yield 26 gm., and may be recrystallized from an ether-petroleum ether mixture.

Example II

A mixture of 0.2471 gm. of racemic α-hydroxy-β,β-dimethyl-gamma-butyrolactone and 0.410 gm. of p-nitrobenzenoyl chloride is dissolved in 4 cc. dry pyridine, and heated at 100° for 1 hour. The solution is acidified to Congo red with dilute sulfuric acid, and the precipitated solid dissolves in ether. The ethereal solution is washed with sodium carbonate solution, dried over sodium sulfate, the ether removed in vacuo, and the p-nitrobenzoate ester of racemic α-hydroxy-β,β-dimethyl-gamma-butyrolactone recrystallized from alcohol as needles, M. P. 137–138°.

The camphorsulfonate of racemic-α-hydroxy-β,β-dimethyl-gamma-butyrolactone may be prepared according to the above mentioned method by employing (+) camphorsulfonic acid chloride as a starting material, M. P. 118–120° C.

Example III

Six and one-half gms. of α-hydroxy-β,β-dimethyl-gamma-butyrolacetone and 7.4 gms. of powdered phthalic anhydride are suspended in 10 cc. of dry pyridine, and heated at 100° C. for 1½ hours. The mixture is cooled, acidified with dilute hydrochloric acid, and the precipitate filtered and recrystallized from butanol. M. P. of the hydrogen phthalate ester of α-hydroxy-β,β-dimethyl-gamma-butyrolactone is 172–173°.

Example IV

Equimolecular equivalents of strychnine and racemic hydrogen phthalate of α-hydroxy-β,β-dimethyl-gamma-butyrolactone are dissolved in warm acetone, and then concentrated until crystallization starts. The crystals are filtered, recrystallized from nitrobenzene, and then from ethanol. M. P. of the strychnine salt of the acid phthalate ester of racemic $\alpha$-hydroxy-$\beta,\beta$-dimethyl-gamma-butyrolactone is 207–208°.

The corresponding quinine, quinidine, cinchonine and cinchonidine salts may be prepared in the same manner as the strychnine salt above.

Example V

Equimolecular equivalents of the racemic hydrogen phthalate ester of $\alpha$-hydroxy-$\beta,\beta$-dimethyl-gamma-butyrolactone and brucine are dissolved in a chloroform-alcohol mixture, and concentrated. As the resulting oil is stirred with several portions of petroleum ether, the product solidifies. Upon dissolving in acetone and chilling, the crystalline brucine salt is obtained. After recrystallizing, the M. P. is 113–116°.

Example VI 5.56 gms. of the racemic hydrogen phthalate ester of $\alpha$-hydroxy-$\beta,\beta$-dimethyl-gamma-butyrolactone are treated with dilute sodium carbonate until pH 7.2. Then, 4.04 gms. of ephedrine hydrochloride in 15 cc. of water are added. The solution is concentrated in vacuum at 25°, extracted with chloroform and dried. The oil, obtained after removing the chloroform, is rubbed with ether several times, and then with petroleum ether, which causes the ephedrine salt to solidify, M. P. 65°.

The same product is obtainable by mixing ephedrine with the hydrogen phthalate ester in ether.

Example VII

Six and one-half gms. of the racemic lactone are heated with 5 gms. of succinic anhydride in 5 cc. of dry pyridine for 2 hours at 100° C. The mixture is cooled, ice is added, and the resulting mixture acidified with dilute sulfuric acid. The solution is then extracted with ether, and the ether extract dried over anhydrous sodium sulfate. The solution is concentrated in vacuo, and the resulting oil is distilled at 178–180° under 3 mm. pressure. The acid succinate ester is obtained as a colorless oil, which sets to a waxy solid on cooling.

Example VIII

One hundred and two mg. of (—) $\alpha$-hydroxy-$\beta,\beta$-dimethyl-gamma-butyrolactone and 201.2 mg. of d-camphorsulfonic acid chloride are dissolved in 0.5 cc. dry pyridine, and heated at 100° for two hours. After cooling and adding ice, the mixture is acidified to Congo red with dilute hydrochloric acid. The precipitated product is dissolved in ether, the solution washed with water, and dried over sodium sulfate. The ether is removed in vacuum, and the residual oil crystallizes upon scratching. The camphor sulfonate of (—) $\alpha$-hydroxy-$\beta,\beta$-dimethyl-gamma-butyrolactone on recrystallization from alcohol-petroleum ether mixture, forms long slender needles, M. P. 119–120°.

The foregoing examples are given by way of illustration and not of limitation, and modifications may be made in carrying out the present invention without departing from the spirit and scope thereof.

I claim:
1. The brucine salt of the acid phthalate ester of racemic $\alpha$-hydroxy-$\beta,\beta$-methyl-gamma-butyrolactone.
2. A member selected from the group consisting of the hydrogen phthalate ester of $\alpha$-hydroxy-$\beta,\beta$-dimethyl-gamma-butyrolactone, and alkaloid salts thereof.
3. A member selected from the group consisting of organic dibasic acid half-esters of $\alpha$-hydroxy-$\beta,\beta$-dimethyl-gamma-butyrolactone, and alkaloid salts thereof.
4. A member selected from the group consisting of the hydrogen succinate ester of $\alpha$-hydroxy-$\beta,\beta$-dimethyl-gamma-butyrolactone, and alkaloid salts thereof.

JACOB FINKELSTEIN.

CERTIFICATE OF CORRECTION.

Patent No. 2,328,000. August 31, 1943.

JACOB FINKELSTEIN.

It is hereby certified that error appears in the printed specification of the above numbered patent requiring correction as follows: Page 2, second column, line 29, claim 1, for "methyl" read --dimethyl--; and that the said Letters Patent should be read with this correction therein that the same may conform to the record of the case in the Patent Office.

Signed and sealed this 2nd day of November, A. D. 1943.

(Seal).

Henry Van Arsdale,
Acting Commissioner of Patents.